Jan. 27, 1948.    G. E. JUDD    2,435,085
PULLEY ALIGNER
Filed April 18, 1945
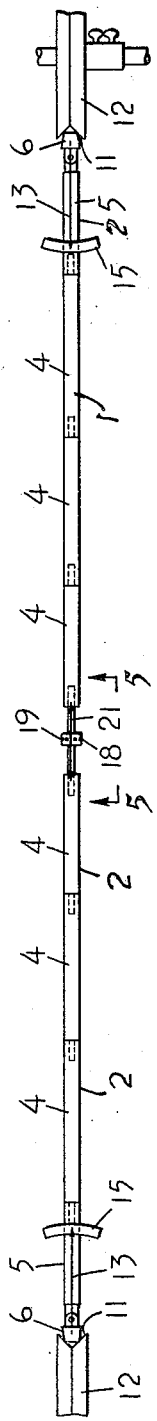
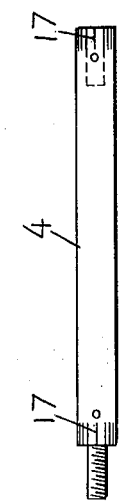
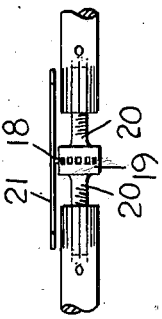
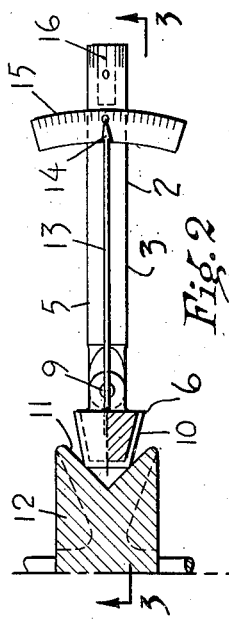
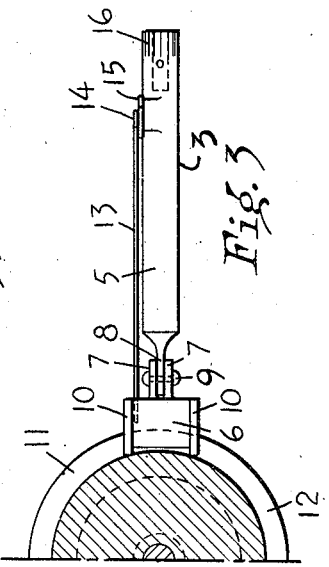
Inventor
George E. Judd
By Ernest J. Mechlin
his Attorney Patented Jan. 27, 1948

2,435,085

UNITED STATES PATENT OFFICE 2,435,085

PULLEY ALIGNER

George E. Judd, Fort Myers, Fla.

Application April 18, 1945, Serial No. 589,073

3 Claims. (Cl. 33—180)

The invention pertains to a device for aligning horizontally or vertically disposed pulleys.

The device of this invention is particularly adaptable for use with related pulleys in confined quarters such as a pulley of a motor and a pulley of a compressor in a domestic refrigerator or a pulley of a motor and a pulley of a fan in a domestic heating plant. Almost without exception, motor and compression pulleys are housed in a restricted area to such an extent that it is physically impossible to determine positively whether the pulleys are in true alignment. While for instance the compressor and motor are adjustably mounted within their housing it is extremely difficult to take utmost advantage of any adjustability due to the fact that the confined quarters let the absolute alignment of the pulleys up to a mere guess or particular skill of an operator. By employing a device of the present invention all elements of chance are removed and pulleys in confined quarters can be aligned perfectly.

An object of the invention is to provide a device whereby pulleys may be aligned perfectly and true, and may be moved relative to one another so as to establish a correct and accurate distance between the pulleys.

Another object of the invention is to provide a device whereby misalignment of pulley grooves is registered and the distance between pulley axes can be established.

The above and numerous other objects of the invention will become apparent from the succeeding description considered together with the accompanying drawing; the latter of which discloses by several views an exemplification of the invention and wherein:

Figure 1 is a detailed plan view of a device embodying the present invention.

Figure 2 is an enlarged sectional and plan view of an end portion of the device shown in Figure 1.

Figure 3 is an enlarged side elevational view taken along the lines 3—3 of Figure 2, looking in the direction of the arrows.

Figure 4 is an enlarged view of another portion or intermediate part of the device shown in Figure 1.

Figure 5 is an enlarged vertical or elevational view of a central part of the device shown in Figure 1 and taken along the lines 5—5 of Figure 1, looking in the direction of the arrows.

Referring now in detail to the drawing, wherein like reference characters indicate like parts, the numeral 1 is employed to designate, in a somewhat general manner, a pulley aligning device embodying the present invention. It may be well at this stage of the description to set forth the fact that this device is adapted for aligning pulleys or any type of wheels that are located or disposed in a common plane; that is to say, the device is to be associated with wheels which do not have a common axis, but, rather, with wheels or pulleys that have their axes spaced from one another but parallel or substantially parallel to one another. To this extent, therefore, the device is arranged so that by associating it with pulleys or wheels it can be easily and readily determined if the wheels or pulleys have their axes other than parallel to one another and if the wheels or pulleys lie in the same or different planes. As will be appreciated, if the pulleys are disposed in different planes, that is to say, if the central plane of one pulley does not coincide with the central plane of a related pulley, then when these misaligned pulleys are connected by a driving belt the latter will not only tend to cant the pulleys on their axles, journals or driving shafts but, further, the driving belt itself will tend to become unseated from the pulleys and the side edges particularly of the driving belt will eventually become frayed to such an extent that the belt will eventually fail.

The pulley aligning device generally comprises a series of axially aligned rods 2 formed by spaced end or terminal rods 3 and connecting intermediate rods 4. While a plurality of intermediate rods are illustrated, the number of these rods which may be employed is governed by the distance between related pulleys and, accordingly, the number of intermediate rods which are to be employed is entirely optional. The one or inner end of each terminal rod is provided with internal threads with the threads of the respective terminal rods being reversed from one another, that is to say, one terminal rod is provided with right hand turned threads while the other end rod is provided with opposite or left hand turned threads. The intermediate rods are provided with threads corresponding to the associated terminal rods so that the intermediate rods may be threadedly interlocked with the terminal rods.

Movably associated with a free or outer extremity of each terminal rod is an end piece, pulley contact block or head piece 6 which has spaced hinging ears 7 outstanding therefrom to have a tongue 8 interposed therebetween. The tongue 8 is formed by flattening or otherwise arranging the free end of each terminal rod. A pivot pin or any securing means 9 bisects the hinging ears and interposed tongue to form a pivotal connection between each end block and related terminal rod. The pivot pins are preferably located on the axis of the device which is the axis of the joined or connected rods and thus any pivotal movement of the end pieces will be accurately reflected. The pulley contact blocks are each somewhat truncated when considered from one view (see particularly Figure 2) and, accordingly, are provided with edge defining beading 10 outstanding therefrom. The beading on each end block is adapted to point contact a groove 11 of a related pulley 12 in a plurality of positions and thus the contact block is arranged to be centralized with respect to a pulley. This particular formation of each contact block permits the association of the block with any size pulley, the latter of which need not necessarily have its face formed by a V-shaped groove. The beading further allows the block to be so arranged with a pulley that the common axis of all of the rods lies in a plane passing through the axis of the pulley.

In order to determine the exact respective relations of associated pulleys each contact block has extending therefrom a pointer or arm 13 having one end thereof anchored by any manner in the contact block and the opposite or free end thereof formed after the fashion of an arrow head as at 14. Secured to each terminal rod is a radial plate 15 which carries on its upper face a series of graduations or indicia means underlying the arm arrow head so that any variation of the arm about the pin 9 will be definitely determinable. The center of the graduations marked 0 lies on the axis of the terminal arms and therefore when the pointers overlie the mark 0 the related pulleys, contact blocks and rods are in perfect alignment. The end of each terminal rod also carries graduations as indicated particularly in Figures 2 and 3 by the reference character 16 and these graduations are to be aligned with correspondingly spaced graduations 17 on the ends of the intermediate rods (see Figure 4). By viewing the relationship of the graduations 16 and 17 it can be determined definitely whether the pulleys 12 are in the same plane or if one pulley is canted or twisted with respect to the other pulley. Further, it is the present intention to have the intermediate rods of different lengths so that the device may be made of such an effective length to accommodate or bridge two related pulleys irrespective of the distance therebetween. By way of explanation of this last mentioned feature, it will be understood that the distance between pulleys in one domestic refrigerator or domestic heating plant or any such component wherein related pulleys are confined or located in a restricted area will vary, and by providing intermediate rods of different lengths the device may be assembled so as to be employed in any such component.

Means have been provided in the device to function as a spreader or power mechanism between two adjacent or related intermediate rods. The power screw comprises a central hub 19 having extending axially thereof in opposite directions stems or threaded elements 20, one of which is provided with a right hand screw thread and the other of which has a left hand screw thread. These screw threads are of the same turnings as the threads in the related intermediate rods so that a rotation of the power screw in one direction will elongated the device and a counter turning of the power screw will shorten the effective length of the device. Accordingly, not only is the power means adapted to ensure a contact between the blocks and pulleys but it may be employed to urge the pulleys apart so as to establish the proper distance between the pulleys.

In order to establish whether the contact block on one side of the power means is in true alignment with the contact block on the other side of the power means the central hub carries an indicating arm 21 extending axially of the power means and, accordingly, the ends of the indicating arm can be aligned with the graduation 17 on the immediately underlying intermediate rod ends to reveal the relationship between the adjacent intermediate rods.

From the above it will be noted that various changes and alterations may be made to the illustrated and described construction without departing from the spirit of the invention and scope of the appended claims.

I claim:

1. In a pulley aligning device, the combination of end rods and intermediate rods aligned axially and threadedly connected together, indicia means carried by contiguous ends of said rods for determining the degree of relative rotation therebetween, a head piece carried by each end rod, pivotal means connecting each of said head pieces and an associated end rod, each of said head pieces being arranged to contact a groove of a pulley at a number of locations, and pointer means carried by said head piece and being operatively associated with indicia means on said end rods.

2. In a pulley aligning device, the combination of, end rods and intermediate rods aligned axially and threadedly connected together, indicia means carried by contiguous ends of said rods for determining the degree of relative rotation therebetween, means rotatably associated with said intermediate rods for moving them axially of one another, means carried by said rotatable means operatively associated with indicia means on associated ends of said intermediate rods to facilitate the determination of the degree of relative displacement therebetween, a head piece carried by each end rod, pivotal means connecting each of said head pieces and an associated end rod, each of said head pieces being arranged to contact a groove of a pulley at a number of locations, and pointer means carried by said head pieces and being operatively associated with indicia means on said end rods.

3. In a pulley aligning device, the combination of, end rods and intermediate rods aligned axially and threadedly connected together, indicia means carried by contiguous ends of said rods for determining the degree of relative rotation therebetween, means rotatably associated with said intermediate rods for moving them axially of one another, a head piece carried by each end rod, pivotal means connecting each of said head pieces to an associated end rod, each of said head pieces having spaced beading arranged to contact a face of a pulley at a number of locations, and pointer means carried by said head pieces and being operatively associated with indicia means on said end rods.

GEORGE E. JUDD.

REFERENCES CITED

The following references are of record in the file of this patent:

UNITED STATES PATENTS

| Number | Name | Date |
|--------|------|------|
| 1,206,476 | Snyder | Nov. 28, 1916 |
| 1,267,946 | Wester | May 28, 1918 |
| 1,516,549 | Sandbo | Nov. 25, 1924 |
| 2,256,527 | Ring | Sept. 23, 1941 |